(12) United States Patent
Howell et al.

(10) Patent No.: US 12,476,933 B2
(45) Date of Patent: Nov. 18, 2025

(54) SECURE DIRECTORY SERVICES

(71) Applicant: Amazon Technologies, Inc., Seattle, WA (US)

(72) Inventors: Christopher A. Howell, Freehold, NJ (US); Robert Statica, Long Valley, NJ (US); Kara Lynn Coppa, Long Valley, NJ (US)

(73) Assignee: Amazon Technologies, Inc., Seattle, WA (US)

( * ) Notice: Subject to any disclaimer, the term of this patent is extended or adjusted under 35 U.S.C. 154(b) by 67 days.

(21) Appl. No.: 17/156,905

(22) Filed: Jan. 25, 2021

(65) Prior Publication Data

US 2021/0144117 A1 May 13, 2021

Related U.S. Application Data

(63) Continuation of application No. 15/988,228, filed on May 24, 2018, now Pat. No. 10,944,713, which is a continuation of application No. 14/572,094, filed on Dec. 16, 2014, now abandoned.

(60) Provisional application No. 61/931,428, filed on Jan. 24, 2014, provisional application No. 61/917,216, filed on Dec. 17, 2013.

(51) Int. Cl.
| | | |
|---|---|---|
| *H04L 51/48* | (2022.01) | |
| *H04L 9/00* | (2022.01) | |
| *H04L 9/06* | (2006.01) | |
| *H04L 9/08* | (2006.01) | |
| *H04L 9/32* | (2006.01) | |
| *H04L 51/08* | (2022.01) | |

(52) U.S. Cl.
CPC .............. *H04L 51/48* (2022.05); *H04L 9/006* (2013.01); *H04L 9/0643* (2013.01); *H04L 9/0869* (2013.01); *H04L 9/3236* (2013.01); *H04L 51/08* (2013.01)

(58) Field of Classification Search
CPC ..... H04L 9/0869; H04L 9/0643; H04L 9/006; H04L 9/3226; H04L 51/08; H04L 51/48
USPC ........................................................ 713/168
See application file for complete search history.

(56) References Cited

U.S. PATENT DOCUMENTS

| | | | |
|---|---|---|---|
| 8,667,271 B2 | 3/2014 | Shkolnikov et al. | |
| 9,177,293 B1* | 11/2015 | Gagnon | H04L 51/212 |
| 2002/0052921 A1* | 5/2002 | Morkel | H04L 63/0421 |
| | | | 709/229 |
| 2002/0111993 A1* | 8/2002 | Reed | H04L 63/12 |
| | | | 713/176 |
| 2003/0084050 A1 | 5/2003 | Hall et al. | |
| 2004/0025057 A1* | 2/2004 | Cook | H04L 63/123 |
| | | | 726/28 |
| 2004/0148506 A1* | 7/2004 | Prince | H04M 3/38 |
| | | | 713/176 |
| 2006/0236089 A1* | 10/2006 | Cohen | G06F 16/27 |
| | | | 713/150 |
| 2007/0192464 A1* | 8/2007 | Tullberg | H04L 61/5014 |
| | | | 709/223 |
| 2008/0065878 A1* | 3/2008 | Hutson | H04L 9/3297 |
| | | | 713/153 |
| 2008/0102819 A1* | 5/2008 | Bengtsson | H04M 3/42093 |
| | | | 455/425 |
| 2008/0235336 A1 | 9/2008 | Stern et al. | |
| 2011/0119276 A1* | 5/2011 | Borghetti | G06Q 10/10 |
| | | | 707/E17.084 |
| 2011/0131219 A1* | 6/2011 | Martin-Cocher | H04L 61/4594 |
| | | | 707/754 |
| 2011/0246512 A1* | 10/2011 | Lubarski | G06Q 10/10 |
| | | | 707/769 |
| 2012/0030743 A1 | 2/2012 | Semba | |
| 2012/0240236 A1* | 9/2012 | Wyatt | G06F 21/10 |
| | | | 726/25 |
| 2013/0022284 A1* | 1/2013 | Zheng | G06Q 10/06 |
| | | | 382/229 |
| 2014/0090042 A1 | 3/2014 | Short, III et al. | |
| 2014/0189808 A1* | 7/2014 | Mahaffey | G06F 21/6245 |
| | | | 726/4 |
| 2014/0207900 A1 | 7/2014 | Liu et al. | |
| 2015/0370918 A1 | 12/2015 | Patterson et al. | |
| 2016/0034692 A1 | 2/2016 | Singler | |
| 2016/0099963 A1* | 4/2016 | Mahaffey | H04L 63/166 |
| | | | 726/25 |
| 2017/0070585 A1* | 3/2017 | Patvarczki | H04L 61/4594 |

FOREIGN PATENT DOCUMENTS

WO     2014140736 A1    9/2014

OTHER PUBLICATIONS

NPL Search Terms (Year: 2022).*
NPL Search Terms (Year: 2024).*
NPL Search Terms (Year: 2025).*
2015, March, Author Unknown, "Threema Cryptography Whitepaper", Threema.

* cited by examiner

*Primary Examiner* — Syed A Zaidi
(74) *Attorney, Agent, or Firm* — Davis Wright Tremaine LLP

(57) ABSTRACT

Secure directory services are disclosed. A cryptographic hash of a foreign identifier associated with a potential user is received. A determination is made that the received cryptographic hash of the foreign identifier matches a representation of a stored entry. In response to the determination, a transmission of a representation of a native identifier associated with the stored entry is transmitted to the sender of the cryptographic hash of the foreign identifier.

20 Claims, 15 Drawing Sheets

SECURE DIRECTORY SERVICES

CROSS REFERENCE TO OTHER APPLICATIONS

This application is a continuation application of U.S. patent application Ser. No. 15/988,228, entitled "SECURITY DIRECTORY SERVICES," filed on May 24, 2018, now U.S. Pat. No. 10,944,713, which is a continuation of U.S. patent application Ser. No. 14/572,094, entitled "SECURITY DIRECTORY SERVICES," filed on Dec. 16, 2014, which claims priority to U.S. Provisional Patent Application No. 61/931,428, entitled "SECURE DIRECTORY SERVICES," filed Jan. 24, 2014, and U.S. Provisional Patent Application No. 61/917,216, entitled "SECURE DIRECTORY SERVICES (SDS) REPRESENTS THE SECURE AND ANONYMOUS IMPLEMENT OF THE ASSOCIATION OF FOREIGN AND NATIVE SYSTEM IDENTIFIERS TO NATIVE SYSTEMS," filed Dec. 17, 2013, the disclosures of which are incorporated herein by reference in their entirety.

BACKGROUND OF THE INVENTION

Existing systems such as those that provide social networking, and other services, increasingly offer users the ability to locate and connect with their friends/acquaintances that are also users of such services, particularly when first signing up for the service. One typical way this is accomplished is as follows. A user is asked by the service to grant permission for the service to access the user's contacts (e.g., a contact manager on a mobile device). The service uploads the user's contact entries to the service, which then stores the user's contacts and performs searches of existing users for matches. Unfortunately, such schemes present a variety of problems. As one example, contact information, once harvested from users and stored at the service, is an attractive target to criminals (e.g., who will attack the service to collect the contact information). As another example, unscrupulous services might sell or otherwise misuse the collected information without user consent. Improvements in managing user contact information are therefore desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
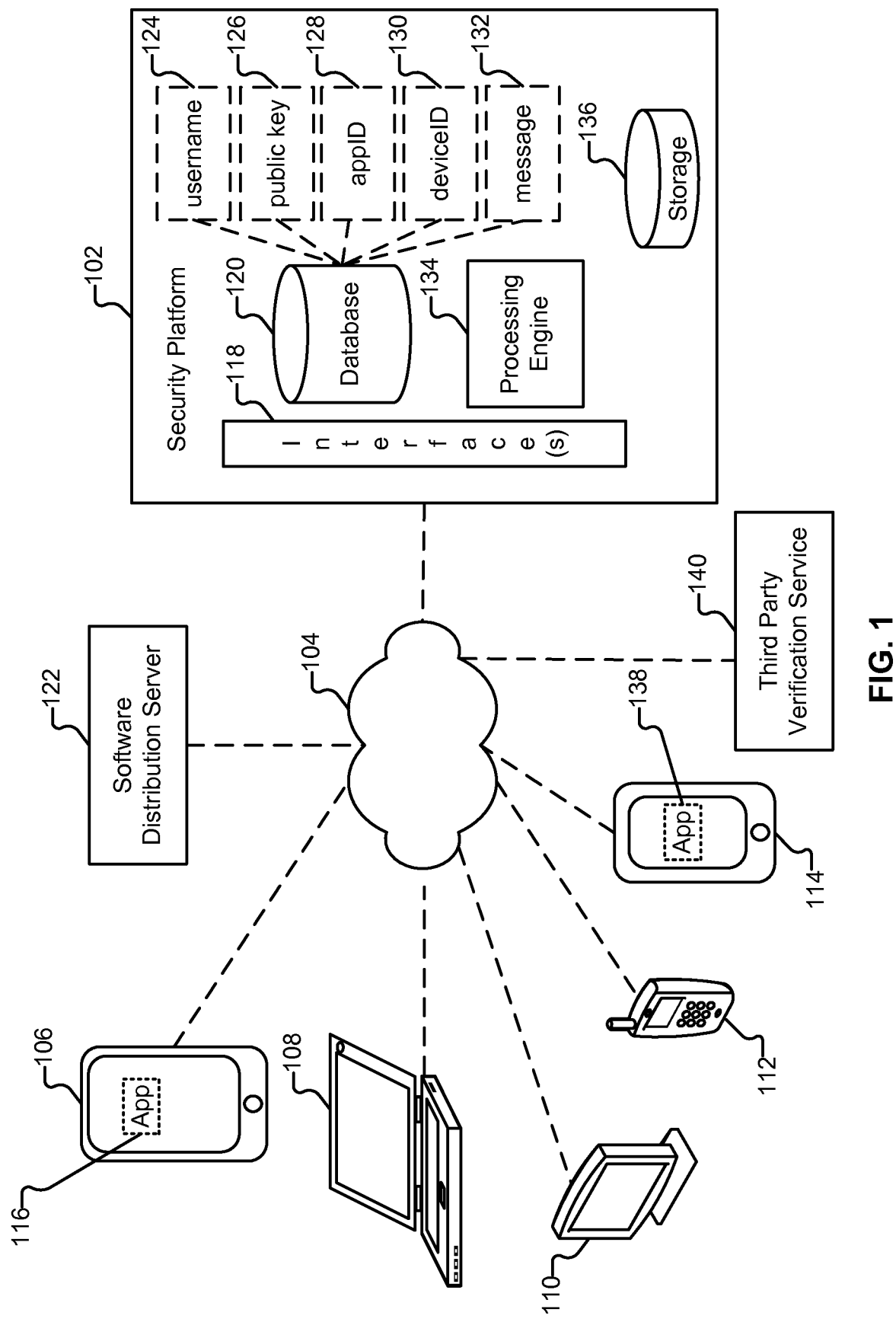
FIG. 1 illustrates an embodiment of an environment in which the exchange of secure communications is facilitated by a security platform.

FIG. 1 illustrates an embodiment 100 of an environment in which the exchange of secure communications is facilitated by a security platform (e.g., security platform 102). As will be described in more detail below, platform 102 facilitates the ability of users of the platform to locate other users of the platform, in a secure and privacy preserving manner. The secure directory services described herein can be used in conjunction with secure messaging services (such as are provided by platform 102) and can also be used by other types of platforms offering other types of services (i.e., ones not offering secure messaging services such as are described herein). Further, in some embodiments, the secure directory services are provided (e.g., to platform 102 or to another type of platform, as applicable) by a standalone system (e.g., operated by a third party on behalf of platform 102 or another type of platform).

In the environment shown in FIG. 1, a "digital security bubble" (DSB), described in more detail below, encapsulates or is otherwise provided around a message. The DSB allows information such as encryption information, hardware binding information, message security controls, and decryption information—for multiple recipients (as applicable)—to securely travel with the message. Further, the DSB provides cross-platform support. For example, techniques described herein can be deployed on a variety of operating systems (e.g., Linux, iOS, and Windows), on a variety of smart phone platforms (e.g., iPhone, Android, Windows, Blackberry, etc.), and on a variety of device types (e.g., mobile smart phones, tablets, laptops, desktops, etc.). Using techniques described herein, only intended accounts on intended devices are able to decrypt the messages. Thus, for example, the security platform is unable to decrypt messages. As will be described in more detail below, platform 102 can similarly allow users of platform 102 to locate one another using typical contact information (e.g., via phone number, email address, or social networking identifier) without platform 102 itself able to view that contact information.

In various embodiments, users of client devices, such as client devices 106-114, communicate securely with one another using techniques described herein. As shown in FIG. 1, client devices include personal computers (110), laptop computers (108), tablets (106), and mobile telephony devices (112, 114). Some client devices, e.g., tablet device 106, make use of techniques described herein via a messaging application (also referred to as an "app") obtained from a software distribution server 122. The app can be implemented using a variety of technologies, such as Java, Objective C, C, C++, etc. Examples of software distribution servers (which can comprise a single server or multiple servers working in cooperation) include app stores (e.g., provided by Apple, Google, Amazon, Microsoft, Blackberry, and/or other entities) and other webservers offering app (and/or other software) downloads. Client devices can also make use of a web interface (e.g., provided by platform 102) instead of or in addition to a dedicated messaging application installed on the device. Other types of devices not depicted in FIG. 1 can also be used in conjunction with the techniques described herein, such as game consoles, camera/video recorders, video players (e.g., incorporating DVD, Blu-ray, Red Laser, Optical, and/or streaming technologies), and other network-connected appliances, as applicable.

Communications are exchanged via one or more networks (depicted collectively in FIG. 1 as network cloud 104). Such networks can include wired, wireless, cellular, and satellite networks. And, such networks can be closed/private networks, as well as open networks (e.g., the Internet). Further, as used herein, "communications" and "messages" can take a variety of forms, including: text messages, documents, audiovisual files, SMSes, and voice and video calls. Further, in addition to personal, business, or other types of conversations, the content can pertain to electronic transactions such as credit card security, password protection, directories, storage drive protection, video on demand security, online gaming, gambling, electronic distribution of music, videos, documents, online learning systems, databases, cloud storage and cloud environments, bank transactions, voting processes, military communications, security of medical records, communication between medically implanted devices and doctors, etc. As will be described in more detail below, the exchange of communications is facilitated by security platform 102 (or embodiments thereof, as applicable).

As will be described in more detail below, a variety of entities can operate embodiments of platform 102. Further, multiple embodiments of platform 102 can exist simultaneously in an environment (with those multiple embodiments either operated by a single entity, or by different entities) with the techniques described herein adapted as applicable.

For example, platform 102 can be operated by a non-profit organization (or an individual, a company, or any other appropriate type of entity or set of entities) for use by the general public (e.g., with arbitrary members of the public able to use platform 102 to exchange communications). As another example, an enterprise organization can operate an embodiment of platform 102 exclusively for use by the employees of the enterprise (and, as applicable, other individuals, such as vendors). As yet another example, a company (or other entity or entities) can operate one or multiple instances of platform 102 on behalf of multiple organizations, such as small businesses or companies, schools, charitable organizations, etc.

A. Installation/Initialization/Registration

Suppose a user of client device 106 (hereinafter referred to as "Alice") would like to send a secure message to her friend Bob (a user of client device 114) in accordance with techniques described herein. In some embodiments, in order to send a message to Bob, Alice first obtains a copy of a messaging application suitable for her device. For example, if Alice's tablet device runs iOS, she could obtain an "app" for her tablet from the Apple App Store (an example of software distribution server 122). Bob similarly obtains an appropriate application suitable for his client device 114 (e.g., an Android-based smartphone) from an appropriate location (e.g., the Google Play store or Amazon Appstore). In some embodiments, client devices make use of a web-based application (e.g., made available by platform 102 through interface 118), instead of, or in addition to, a dedicated installed application.

In embodiments where platform 102 is operated on behalf of specific groups of individuals (e.g., on behalf of employees of a company, students/teachers at a school, company stockholders, members of a club, premium customers, etc.), the app can be obtained from a publicly accessible software distribution server as Alice and Bob do above (e.g., from the Google Play store), can be obtained from a privately operated software distribution server (e.g., made available only to company-issued devices or devices otherwise authorized to communicate with the private server), can be provisioned by support personnel associated with the group (e.g., by being directly installed by the support personnel or included in a device image), etc., as applicable. For example, suppose an embodiment of platform 102 is operated by ACME University on behalf of its students and faculty/staff. As mentioned above, the university can itself operate an embodiment of platform 102, or can contract with a third party to make available the embodiment of platform 102 for university users. Freshmen (and other new students/employees, as applicable) at ACME University can be provided with instructions for downloading and installing an ACME University-specific embodiment of the secure messaging application from a university server in conjunction with their new student orientation. As another example, new employees of Beta Corporation can be issued company phones (and/or other devices such as laptops) with an embodiment of the secure messaging application pre-installed and pre-configured by support personnel for Beta Corporation (e.g., where Beta Corporation operates an embodiment of platform 102 on behalf of its employees and business partners). As yet another example, business partners of Beta Corporation (e.g., vendors) can be provided with instructions for provisioning a Beta Corporation-specific embodiment of the secure messaging application via email, or via a website. And, the Beta Corporation-specific embodiment of the secure messaging application can be made available via email, a website, or any other appropriate mechanism.

Figure 2:
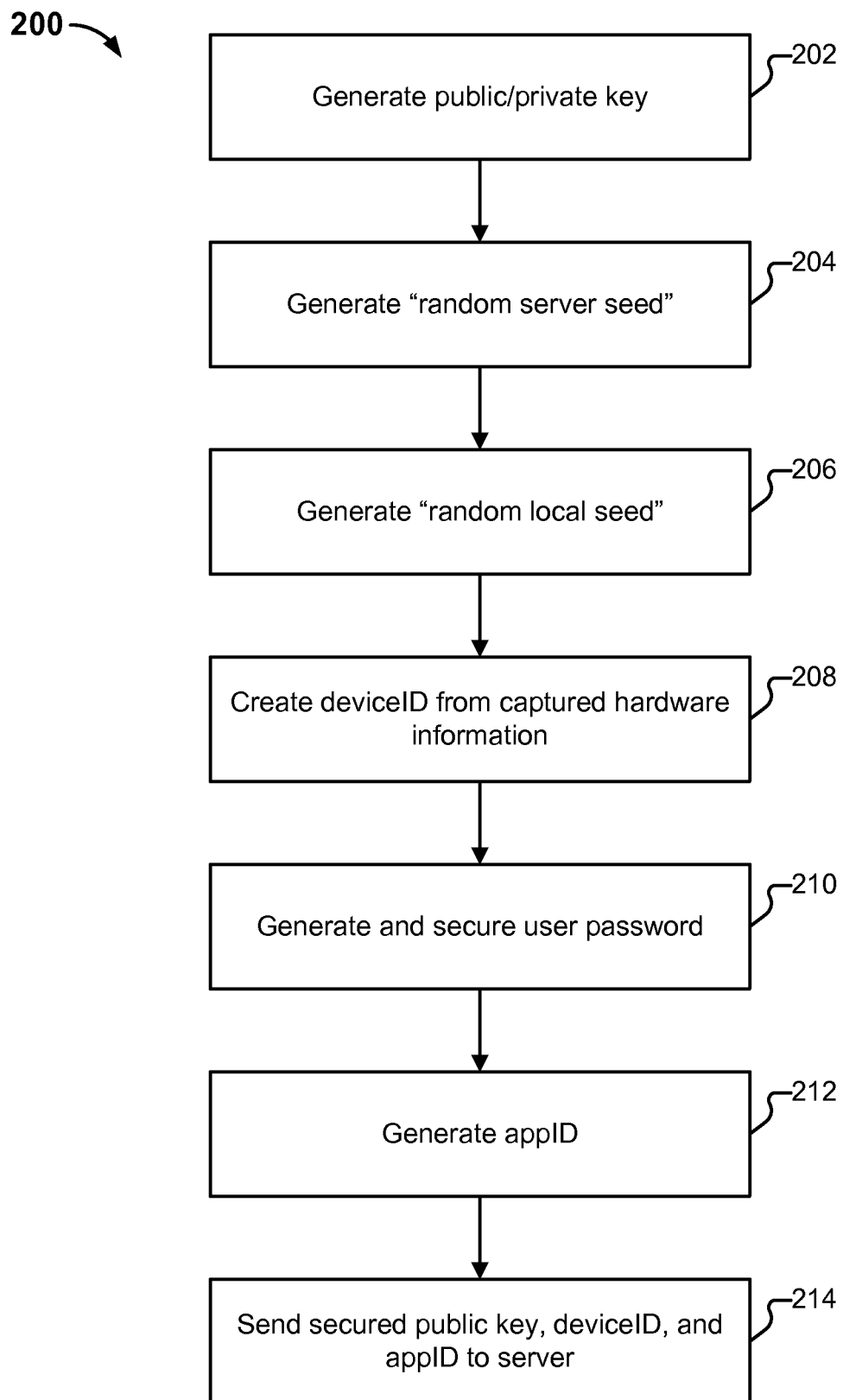
FIG. 2 illustrates an embodiment of an installation and registration process.

Returning to the example of Alice (a member of the public, using an embodiment of platform 102 made available to the public), once Alice's tablet 106 has obtained a copy of the messaging app, the app is installed, and Alice is able to register for an account. An instance of a messaging app usable in conjunction with the techniques described herein is depicted in FIG. 1 as app 116 (installed on device 106). Examples of events that can occur during an installation/initialization/registration process (200) are illustrated in FIG. 2 and will now be described.

In some embodiments, process 200 is performed on a client device, such as Alice's client device 106. The process begins at 202 when a public/private keypair for the application is generated, on client device 106 (e.g., using RSA, ECDH, or any other asymmetric encryption algorithms). As one example, the keypair can be generated using Eliptic Curve Algorithm with Diffie Helman Key Exchange (ECDH). Other cryptographic standards can also be used, such as RSA. At 204, a "random server seed" is generated, and at 206, a "random local seed" is generated. The seeds are used in conjunction with cryptographic key generation, and in some embodiments, the seeds are determined based on captured hardware information (described in more detail below).

At 208, a device identifier ("deviceID") is created from captured hardware information. Examples of captured hardware information include: hard drive identifiers, motherboard identifiers, CPU identifiers, and MAC addresses for wireless, LAN, Bluetooth, and optical cards. Combinations of information pertaining to device characteristics, such as RAM, CACHE, controller cards, etc., can also be used to uniquely identify the device. Some, or all, of the captured hardware information is run through a cryptographic hash algorithm such as SHA-256, to create a unique deviceID for the device. The captured hardware information can also be used for other purposes, such as to seed cryptographic functions.

At 210, Alice is asked, via an interface provided by app 116, to supply a desired username. Alice enters "Alice" into the interface. A determination is made as to whether the username is available. As one example, app 116 can supply a cryptographic hash of "Alice" to platform 102 for checking. If platform 102 does not already have a record for that hash, the username "Alice" is available for Alice to use. If platform 102 already has a record of that hash, Alice is instructed by the interface to pick an alternate username. Once Alice has selected an available username, she is asked to supply a password. In some embodiments, portions of process 200 may be omitted (or performed by other entities, as applicable). For example, where a university student at ACME University is getting set up to use an ACME University-specific embodiment of platform 102, the user's name may be preselected or otherwise issued by the University, rather than being selected by the user.

At 212, an application identifier ("appID") is created. The appID is a unique identifier for the particular installation of the messaging app. If Alice installs the messaging app on multiple devices, each of her devices will have its own unique appID. (And, each of her devices will also have its own unique deviceID.) In some embodiments, the appID is created by hashing Alice's selected password and other information such as device information.

Finally, at 214 Alice's public key, deviceID, and appID are sent to platform 102 in a secure manner. As one example, in some embodiments app 116 is configured to communicate with platform 102 via TLS. At the conclusion of process 200, Alice is ready to send and receive secure communications, described in Sections C and E below, respectively.

In various embodiments, Alice is also asked (e.g., during enrollment—after portion 214 of process 200) to optionally provide contact information usable by her friends/acquaintances to identify her as a registered user of platform 102. For example, Alice can be asked (e.g., via an interface provided by app 116) to optionally provide one or more of her email address(es), cellular or other telephone numbers, and/or other identifiers such as social network identifiers (e.g., Facebook ID, Twitter ID). Alice can also provide her contact information at a later time (i.e., after enrollment). As will be described in more detail below (e.g., in Section F), other users (such as Bob) who know Alice's contact information can determine that Alice is now a user of platform 102, in a privacy preserving manner—without platform 102 storing Alice's contact information in the clear.

B. Security Platform

As mentioned above, security platform 102 is configured to facilitate the exchange of communications (e.g., among any/all of client devices 106-114). Also as mentioned above, platform 102 can be operated by a variety of entities on behalf of a variety of end users. For example, one embodiment of platform 102 can be made available to members of the public, whether as a public service, or for a fee. As another example, another embodiment of platform 102 can be made available by a business, by a school, by a charitable organization, etc., and its use limited to its employees/students/members, etc., as applicable. Additional detail regarding various aspects of embodiments of platform 102 will now be provided.

Security platform 102 includes one or more interface(s) 118 for communicating with client devices, such as client devices 106-114. As one example, platform 102 provides an application programming interface (API) configured to communicate with apps installed on client devices, such as app 116 and app 138. Platform 102 can also provide other types of interfaces, such as a web interface, or stand alone software programs for desktops and laptops, running on various Operating Systems (OSes). The web interface can allow users of client devices such as client devices 108 and 110 to exchange messages securely (whether with one another or other users) without the need for a separately installed messaging application. The stand alone software program allows users to exchange secure messages via software that is downloaded by each user.

Security platform 102 also includes a database 120 (e.g., running MySQL, Oracle, or other appropriate software). Included in database 120 is a record for each user of platform 102. Each record has associated with it information such as the user's public key, deviceID(s), appID(s), and messages. As shown in FIG. 1, database 120 is relational and stores information in a variety of tables, including a table of hashed usernames (124), a table of public keys (126), a table of deviceIDs (130), a table of appIDs (128), and a table of messages (132). In various embodiments, additional tables are also present, such as a foreign identifier table, which associates a set of one or more hashed foreign identifiers with a given hashed native username (e.g., a hashed username 124 appearing in table). Other techniques can also be used to store the information used by platform 102. For example, messages can be stored in a separate storage 136 instead of being stored within database 120.

Finally, security platform 102 includes a processing engine 134 which performs a variety of tasks, including interacting with database 120 on behalf of interface(s) 118. The embodiment of platform 102 depicted in FIG. 1 comprises standard commercially available server hardware (e.g., having a multi-core processor(s), 16G+ of RAM, gigabit network interface adaptor(s), and hard drive(s)) running a typical server-class operating system (e.g., Linux). In various embodiments, platform 102 is implemented across a scalable infrastructure comprising multiple such servers, solid state drives, and/or other applicable high-performance hardware.

Whenever platform 102 is described as performing a task, a single component, a subset of components, or all components of platform 102 may cooperate to perform the task. Similarly, whenever a component of platform 102 is described as performing a task, a subcomponent may perform the task and/or the component may perform the task in conjunction with other components.

C. Sending DSB Secured Messages

Returning back to Alice's desire to send a message to Bob: at the conclusion of Section A above, Alice has successfully registered her username ("Alice") with security platform 102. (And, Bob is an existing user of platform 102.) Suppose Alice would like to send a message to Bob. She starts app 116 and is presented with an interface that includes a "compose" option. Alice selects the compose option and is presented with a message composition interface.

Figure 3:
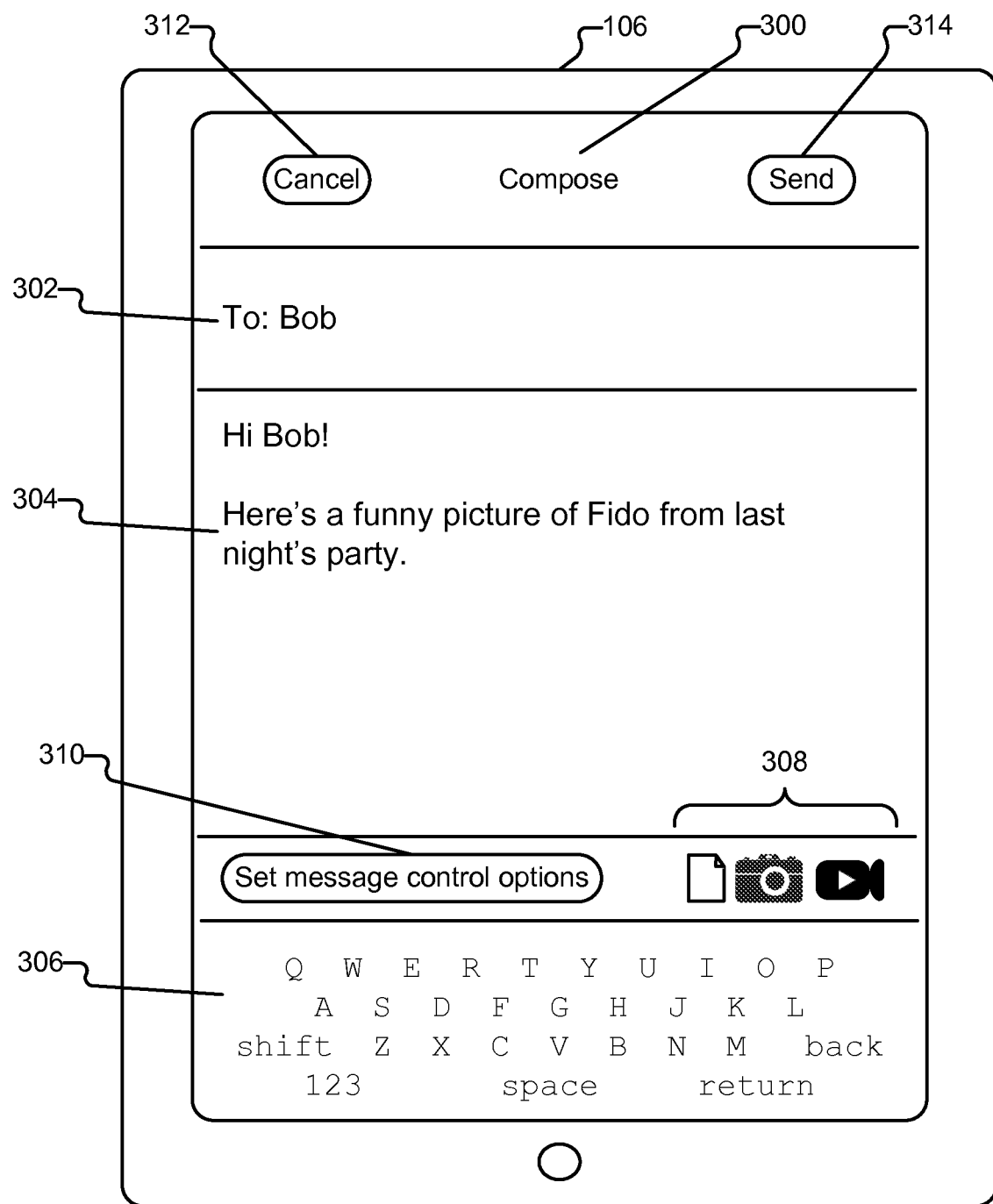
FIG. 3 illustrates an example of a message composition interface.

An example message composition interface is shown in FIG. 3. In particular, FIG. 3 depicts interface 300 as rendered on an example tablet device 106, connected to the Internet via an appropriate connection, such as: 3G, 4G or higher cellular connection, WiFi, satellite, wireless or wired LANs, Bluetooth, etc. Tablet device 106 includes a touchscreen. An on-screen keyboard is provided for Alice in region 306. Alice can enter the usernames of one or more recipients in region 302. In the example shown in FIG. 3, Alice knows that Bob's username on platform 102 is "Bob" (e.g., because Bob told her that was his username). As will be described in more detail below, in addition to personally asking her friends/acquaintances for their platform 102 usernames, Alice can also determine which of her friends/acquaintances use platform 102 using a secure directory service (e.g., where those friends/acquaintances have opted in to being locatable using techniques described herein).

Alice can enter message text in region 304. Alice can optionally add attachments by interacting with buttons shown in region 308. Examples of attachments include, but are not limited to: documents, pictures, and audiovisual clips. By selecting button 310, Alice can specify various message control options, such as: the lifetime/expiration of the message; on which device(s) it can be unencrypted/read; and sharing, saving, forwarding, recalling, and deleting options.

If Alice is satisfied with her message, she can send it to Bob by clicking the send button (314). If she wishes to cancel out of composing the message, she can click the cancel button (312). Suppose Alice clicks send button (314) after composing the message shown in interface 300. An example of the events that occur, in some embodiments, in conjunction with Alice sending a message is illustrated as process 400 in FIG. 4 and will now be described.

Figure 4:
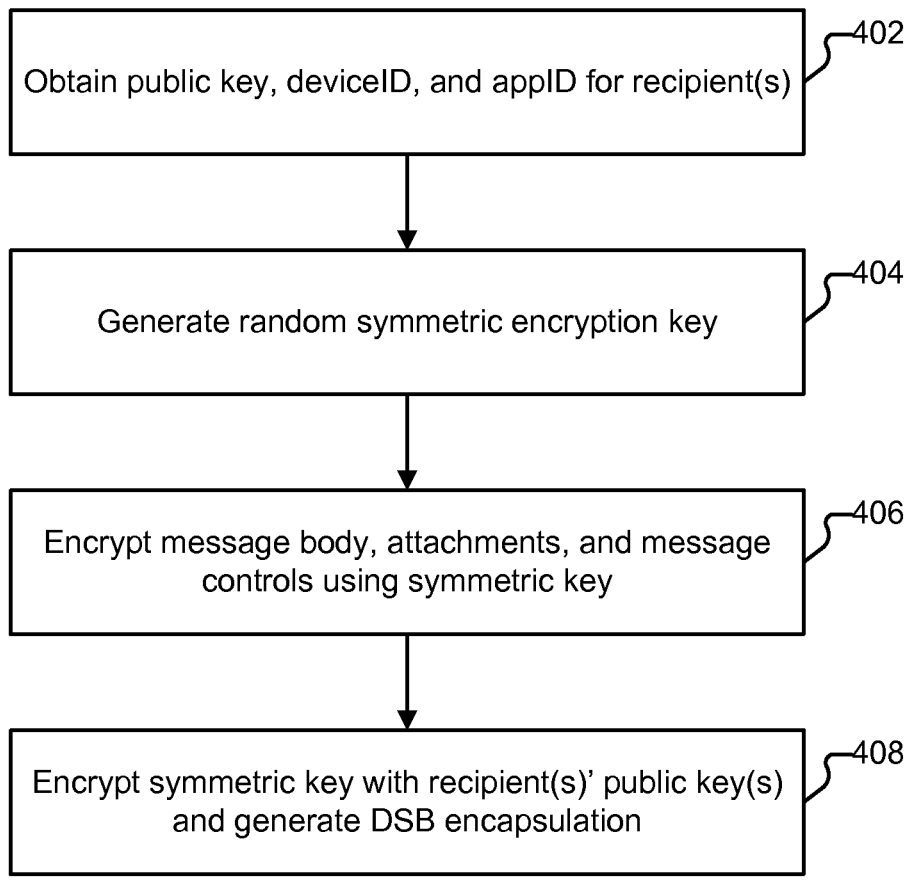
FIG. 4 illustrates an example of a message sending process.

FIG. 4 illustrates an example of a process 400 for sending a DSB-secured message. In some embodiments, process 400 is performed on a client device, such as Alice's client device 106. The process begins at 402 when the public key, deviceID, and appID of a recipient are obtained from platform 102. As will be explained in more detail below, the recipient's public key, deviceID, and appID are used in the encryption of the symmetric key used to encrypt data, and in the DSB encapsulation of the message for the hardware/appID binding of the message. As one example, app 116 can request the information from platform 102 via an API (e.g., interface 118). In some embodiments, the information is retrieved when Alice enters the recipient's name into region 302. In other embodiments, the information is retrieved when Alice clicks send button 314, or at any other appropriate time (e.g., while she is composing a message). In the example shown in FIG. 3, Alice is only sending a message to Bob. If she also desires to send the message to other recipients, she can enter their names in region 302 as well, and their respective public keys, deviceIDs, and appIDs will also be retrieved at 402.

At 404, a random symmetric encryption key is generated (e.g., by app 116 on device 106). As one example, the symmetric key is an AES 256 bit key. At 406, the symmetric encryption key is used to encrypt the message body, any attachments, and any message control options. In some embodiments, Alice's own information (e.g., her public key, deviceID(s), and appID(s) is included in the DSB as well. Finally, at 408, the symmetric key is encrypted with the public key of each recipient. A DSB encapsulation is then generated, and contains the aforementioned components. Examples of the DSB format are provided in Section D below.

In some cases, a user may own multiple devices. For example, Bob may be the owner of device 114 and 112, both of which are configured with secure messaging apps. Each of Bob's installations will have its own deviceID and appID. When the DSB is created, each of Bob's devices will be considered a separate device under the same username account.

The generated DSB is securely transmitted to platform 102 (e.g., by being encrypted with a symmetric key shared by the app and platform 102, and also encapsulated by TLS as an additional security layer). Irrespective of how many recipients Alice designates for her message (and, e.g., how many recipients there are or how many devices Bob has), only one DSB will be created and transmitted to platform 102. Upon receipt of the DSB, processing engine 134 opens the DSB and determines the recipients of the message. Specifically, the processing engine 134 performs a match against the deviceIDs (in a cryptographic hash and camouflaged representation) included in the DSB and the deviceIDs stored in database 120 as well as the username (in a cryptographic hash and camouflaged representation) in the DSB and the ones stored in the database 120. A cryptographic hash and camouflaged representation means that the hash algorithm (i.e., SHA256) that is used for the deviceID, username, and appID values, is further camouflaged, in some embodiments, by taking multiple hashes of the result values (i.e., multiple rounds of SHA256 of the previous SHA256 value—i.e., SHA(SHA(SHA(SHA . . . ))). Processing engine 134 also creates an entry for the received DSB in message table 132 and notifies the recipient(s) that a new message is available. In various embodiments, other actions are also performed by platform 102 with respect to the DSB. As one example, platform 102 can be configured to remove the DSB as soon as the recipient successfully downloads it. As another example, platform 102 can enforce an expiration time (e.g., seven days) by which, if the DSB has not been accessed by the recipient, the DSB is deleted. Where multiple recipients are included in a DSB, platform 102 can be configured to keep track of which recipients have downloaded a copy of the DSB, and remove it once all recipients have successfully downloaded it (or an expiration event has occurred).

D. DSB Examples

Figure 5:
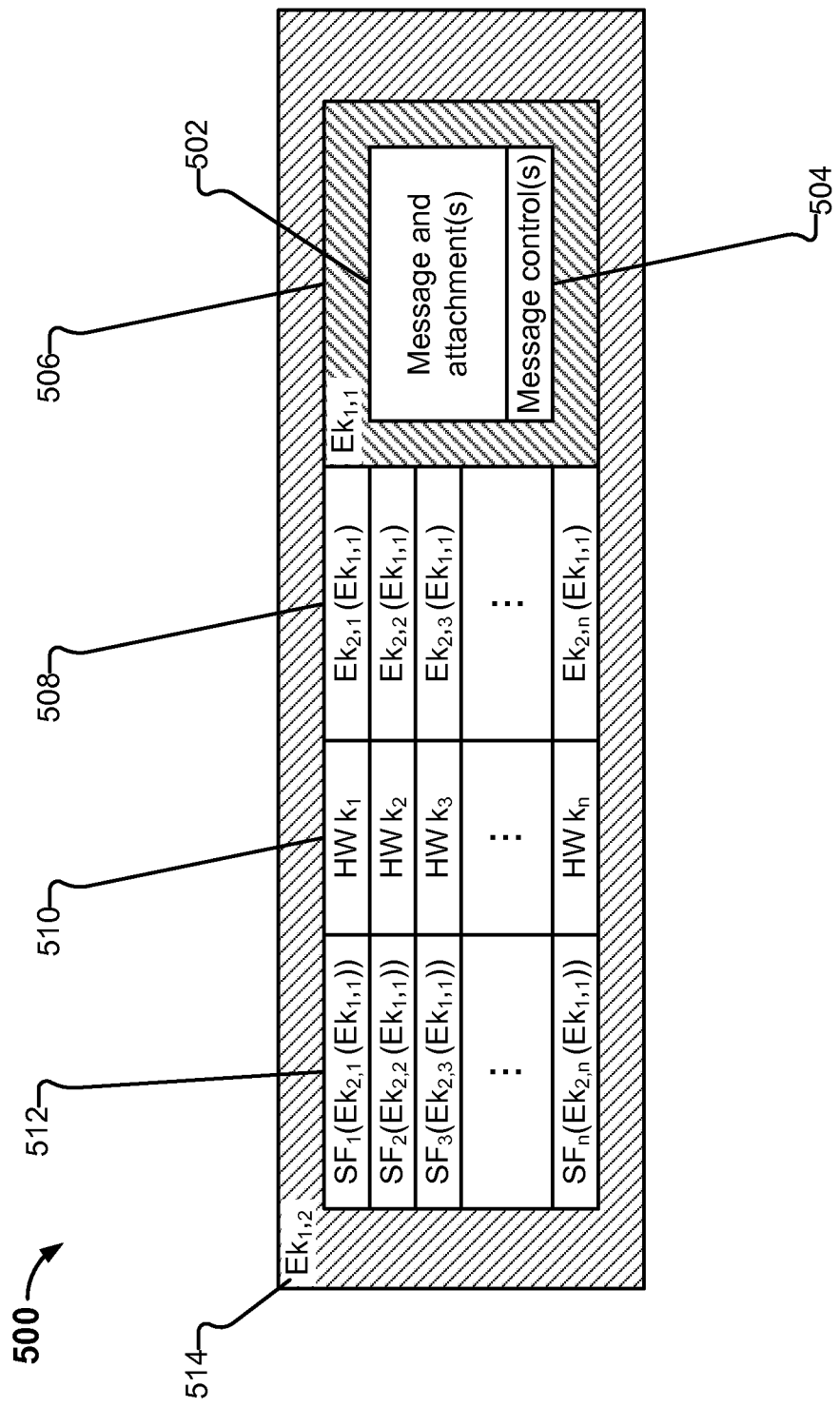
FIG. 5 illustrates an example of a digital security bubble.

FIG. 5 illustrates an example of a digital security bubble (DSB) 500. DSB 500 is an example of output that can be generated by app 116 as a result of executing process 400. In the example shown, DSB 500 includes a message and optional attachments (502), and one or more message controls (504) encrypted with a key $Ek_{1,1}$ (encrypted portion 506). In some embodiments, key $Ek_{1,1}$ is generated by app 116 at portion 404 of process 400. Additional detail regarding portion 506 is shown in FIG. 7, where SSK in FIG. 7 is $Ek_{1,1}$ of FIG. 5 and represents the sender's symmetric shared key used to encrypt the message and attachments.

DSB 500 also includes, for each message recipient 1-$n$, the key $Ek_{1,1}$ encrypted by each of the recipient's respective public keys (as shown in region 508). Further, DSB 500 includes a combination of each recipient's respective deviceID, hashed username, and appID (collectively denoted $HWk_{1-n}$) in region 510. These constituent parts are also referred to herein as "parameters." Additional detail regarding the parameters is shown in FIG. 9—namely, a plurality of parameters (such as hashed username, deviceID, and appID) are encrypted using SK2, which is a symmetric key generated by the client and shared with platform 102.

In some embodiments (e.g., as is shown in FIG. 5), a spreading function is used to spread the encrypted symmetric keys inside the DSB (as shown in region 512), by spreading the bits of the encrypted key in a spreading function generated pattern, with the default function being a sequential block or data. The spreading function also contains the cryptographic hashed representation of the recipient usernames that are used by the server to identify the recipients of the message and to set the message waiting flag for each of them. Finally, the DSB is itself encrypted using key $Ek_{1,2}$ (encrypted portion 514), which is a symmetric key shared between app 116 and platform 102. Additional detail regarding portions 514 and 508 are shown in FIG. 8, where SK1 in FIG. 8 is $Ek_{1,2}$ in FIG. 5 and represents the symmetric encryption key shared by the app and platform 102, and where $User_1Pubkey$ in FIG. 8 is $Ek_{2,1}$ in FIG. 5 and represents the recipient's public key (e.g., generated at 202 of the process shown in FIG. 2).

Figure 6:
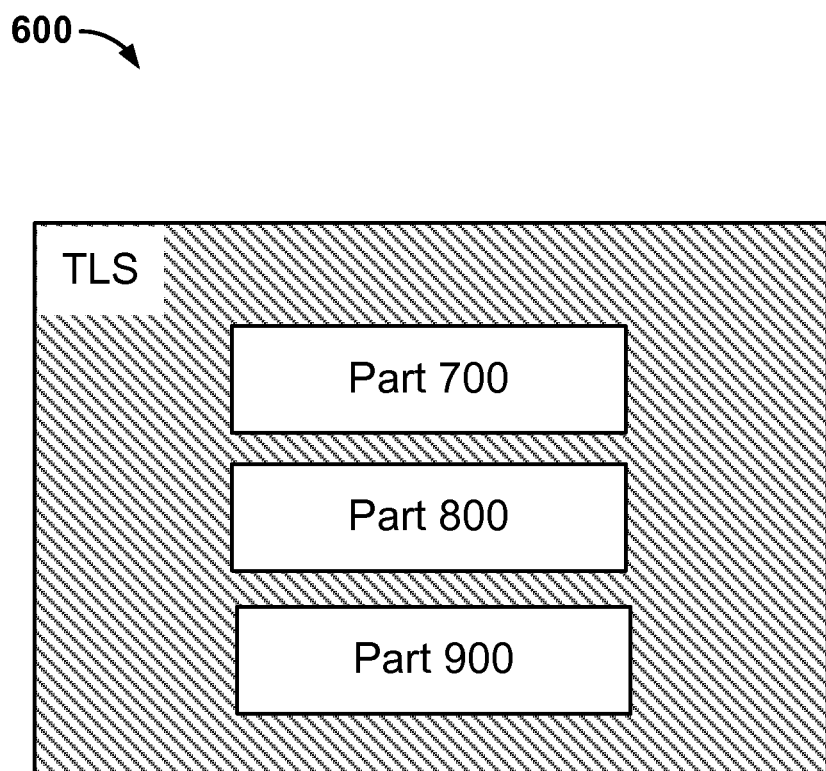
FIG. 6 illustrates an example of a digital security bubble.
Figure 7:
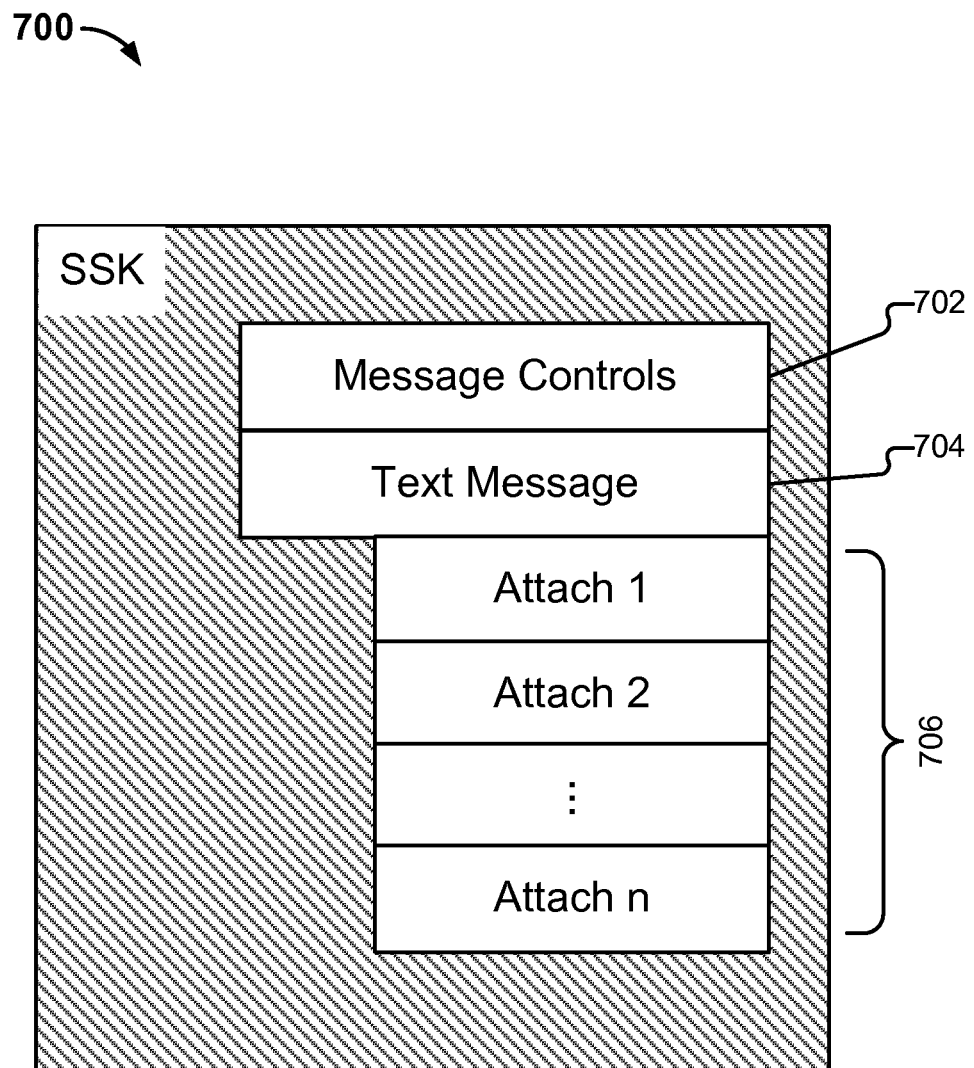
FIG. 7 illustrates an example of a portion of a digital security bubble.
Figure 8:
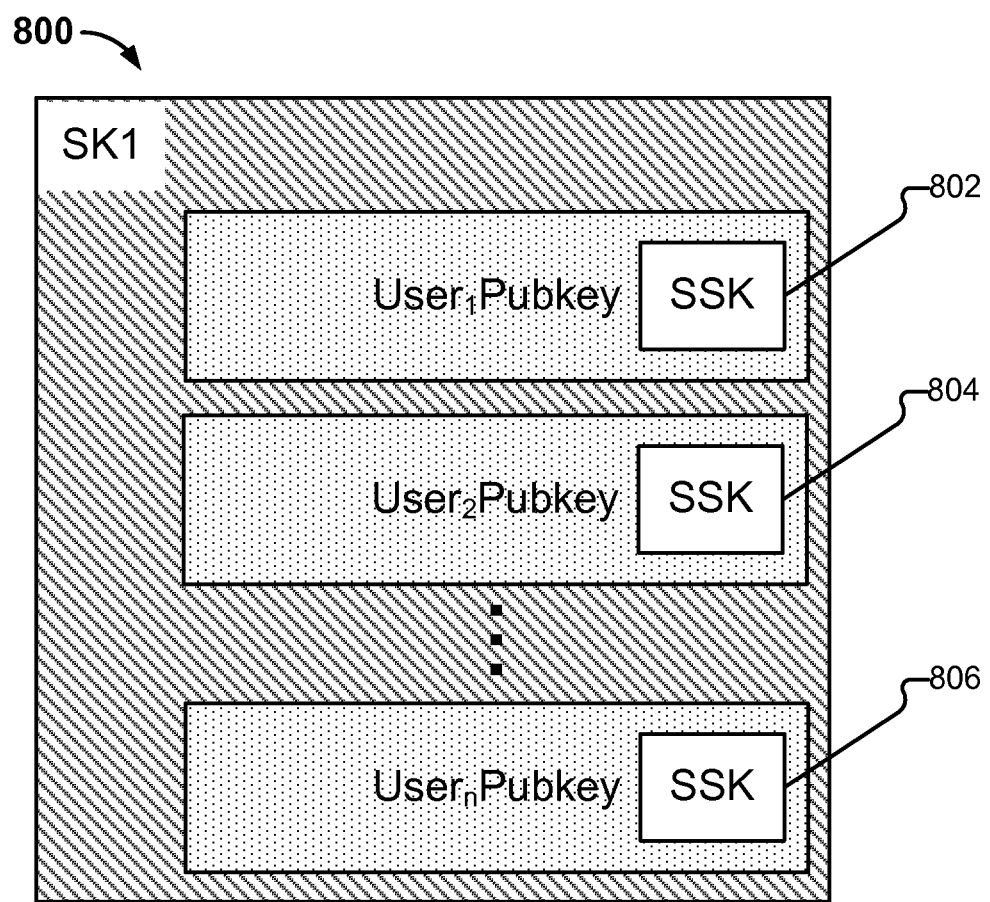
FIG. 8 illustrates an example of a portion of a digital security bubble.
Figure 9:
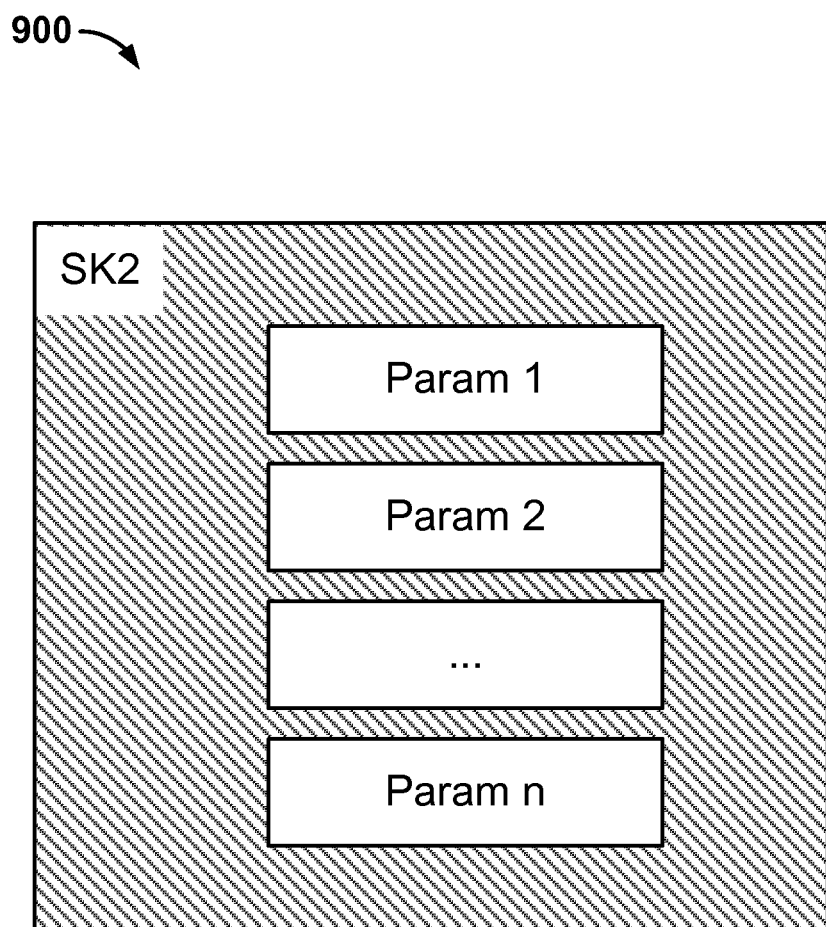
FIG. 9 illustrates an example of a portion of a digital security bubble.

FIGS. 6-9 illustrate additional examples of the construction of an embodiment of a DSB. FIG. 6 illustrates an example of a DSB 600. DSB 600 encapsulates three sub-components—part 700 (the encrypted message, attachments, and message controls), part 800 (the symmetric key encrypted with each recipient's public key), and part 900 (encrypted message parameters). As with DSB 500, a symmetric key (shared by app 116 and platform 102) is used to secure the DSB. In addition, the transmission of the DSB to the server is encapsulated with TLS for an additional security layer. FIG. 7 illustrates part 700 of DSB 600. In particular, part 700 includes the message controls (702), message (704), and attachments (706). Part 700 is encrypted using a shared symmetric key SSK (e.g., $Ek_{1,1}$). FIG. 8 illustrates part 800 of DSB 600. In particular, part 800 includes the shared symmetric key, encrypted to each of the recipients' respective public keys. Further, the collection of encrypted keys (802-806) is encrypted using symmetric key SK1. FIG. 9 illustrates part 900 of DSB 600. In particular, part 900 includes encrypted message parameters. Part 900 is encrypted using symmetric key SK2.

E. Receiving DSB Secured Messages

As mentioned above, Bob is also a user of platform 102. When Bob loads his copy of the messaging app on his smartphone (i.e., app 138 on device 114), the app communicates with platform 102 (e.g., via interface 118) to determine whether Bob has any new messages. Since Alice has sent a message to Bob since he last used app 138, a flag is set in database 120, indicating to app 138 that one or messages are available for download.

Figure 10:
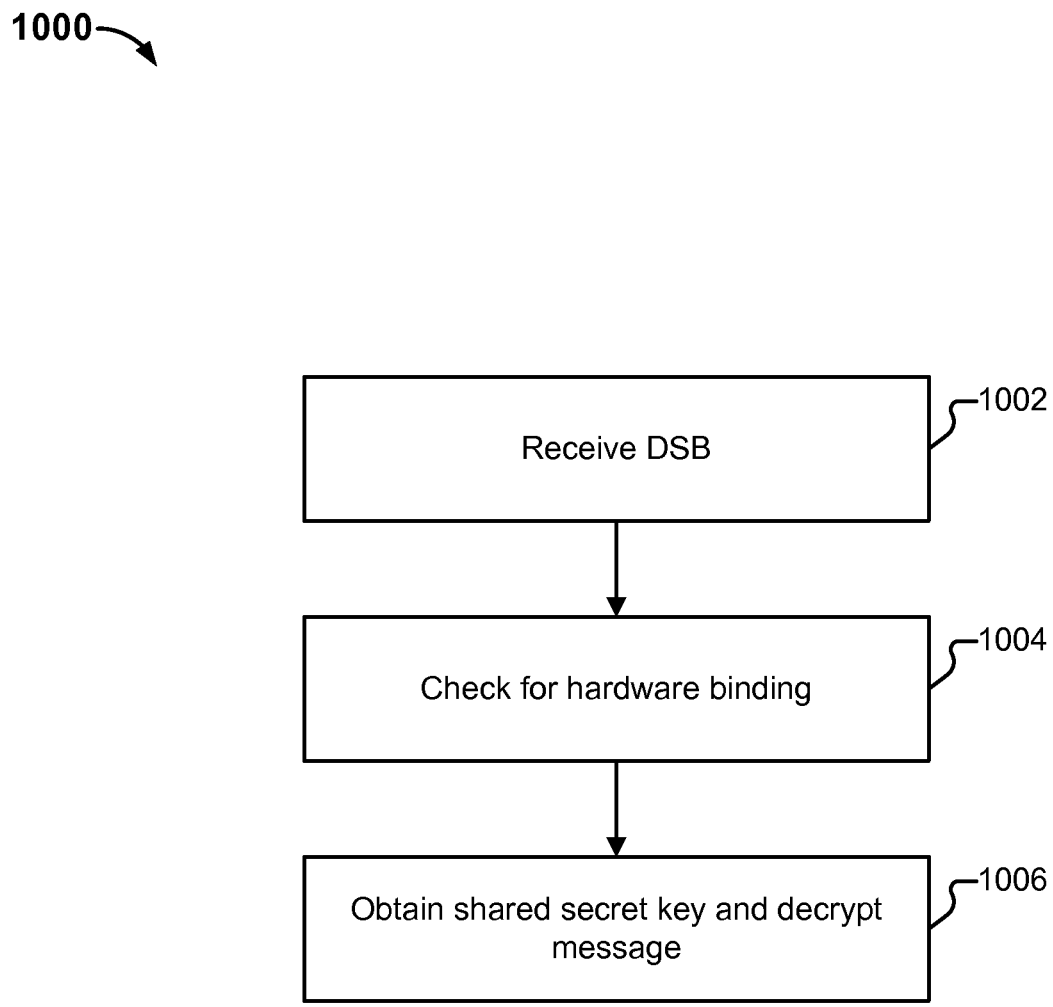
FIG. 10 illustrates an example of a process for accessing a message included inside a digital security bubble.

FIG. 10 illustrates an example of a process 1000 for accessing a message included inside a digital security bubble. In some embodiments, process 1000 is performed on a client device, such as Bob's client device 114. The process begins at 1002 when a DSB is received. As one example, a DSB is received at 1002 when app 138 contacts platform 102, determines a flag associated with Bob's account has been set (e.g., indicating he has one or more new messages), and downloads the DSB from platform 102. In such circumstances, upon receipt of the DSB, client 114 is configured to decrypt the DSB using Bob's private key (e.g., generated by Bob at 202 in process 200).

At 1004 (i.e., assuming the decryption was successful), hardware binding parameters are checked. As one example, a determination is made as to whether device information (i.e., collected from device 114) can be used to construct an identical hash to the one included in the received DSB. If the hardware binding parameters fail the check (i.e., an attempt is being made to access Alice's message using Bob's keys on a device that is not Bob's), contents of the DSB will be inaccessible, preventing the decryption of Alice's message. If the hardware binding parameter check is successful, the device is authorized to decrypt the symmetric key (i.e., using Bob's private key generated at 202) which can in turn be used to decrypt Alice's message (1006).

F. Secure Directory Services

Secure Directory Services (SDSes) are provided in various embodiments of the environment shown in FIG. 1. For example, SDSes can be provided by embodiments of platform 102 and used by users of the secure messaging services provided by platform 102 to identify friends/contacts that are also using the secure messaging services of platform 102. SDSes can also be provided by other platforms, e.g., by third party platforms, that exclusively provide SDSes without providing other services described above as being provided by platform 102, or that provide other services (e.g., a social networking site or a dating service).

Using Secure Directory Services, "foreign system identifiers" are associated with "native system identifiers," without the foreign system identifiers being disclosed (e.g., in cleartext) to the native system. In various embodiments, examples of foreign identifiers include phone numbers, email addresses, social network identifiers, etc.—information pertaining to ways of contacting/identifying a user that are "foreign" to a system such as platform 102. In various embodiments, an example of a native system identifier is a user's username on platform 102. So, for example, Alice might have a native identifier of "Alice" on platform 102, and have the following foreign identifiers: (555)555-1212 (Alice's cellular phone), Alice123@email.com (Alice's email address), and @AliceIsCool (Alice's Twitter handle). Similarly, Bob might have a native identifier of "Bob" on platform 102, and have the following foreign identifiers: (555)555-2222 (Bob's cellular phone), Bob321@example.com (Bob's email address), and Bob4Ever (Bob's account with a social networking site). Where other services (e.g., a dating service) provide secure directory services, other forms of identifiers may be used as the respective foreign/system identifiers. For example, for a service that uses an email address as a native identifier, other forms of contact information (e.g., phone number, social network identifier, and identifier on platform 102, as well as any secondary email addresses belonging to the user) are examples of foreign system identifiers.

Using techniques disclosed herein, Alice can make her foreign system identifiers available for searching by other users of platform 102, without platform 102 having access to (or needing to store) the cleartext (unencrypted) foreign identifiers. Using techniques described herein, other users of platform 102 (e.g., who do not know Alice's native identity on platform 102) can use foreign system identity information that they do know to locate Alice as a user of platform 102. For example, another user, Charlie, can use the techniques described herein to search for Alice (or other users of platform 102) by using Alice's email address(es), phone number(s), social network identifier(s), etc.).

Figure 11:
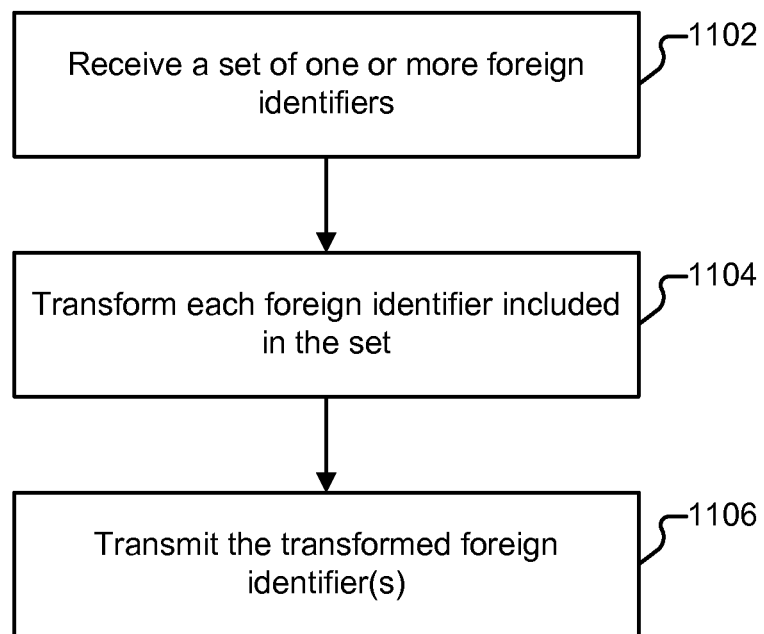
FIG. 11 illustrates an embodiment of a process for registering with a secure directory service.

FIG. 11 illustrates an embodiment of a process 1100 for registering with a secure directory service. In some embodiments, process 1100 is performed by a client device, such as client device 114. In some embodiments, process 1100 is initiated in conjunction with a service registration. For example, process 1100 can be integrated into process 200 such that registering with the secure directory service occurs in conjunction with registering for an account on platform 102. Process 1100 can also be initiated on demand (e.g., when a user such as Bob selects a "Help Other Users Find You" option from a menu offered by app 138 and is presented with interface 1200). Process 1100 can also be repeated (e.g., when Bob wishes to update his foreign identity information).

Figure 12:
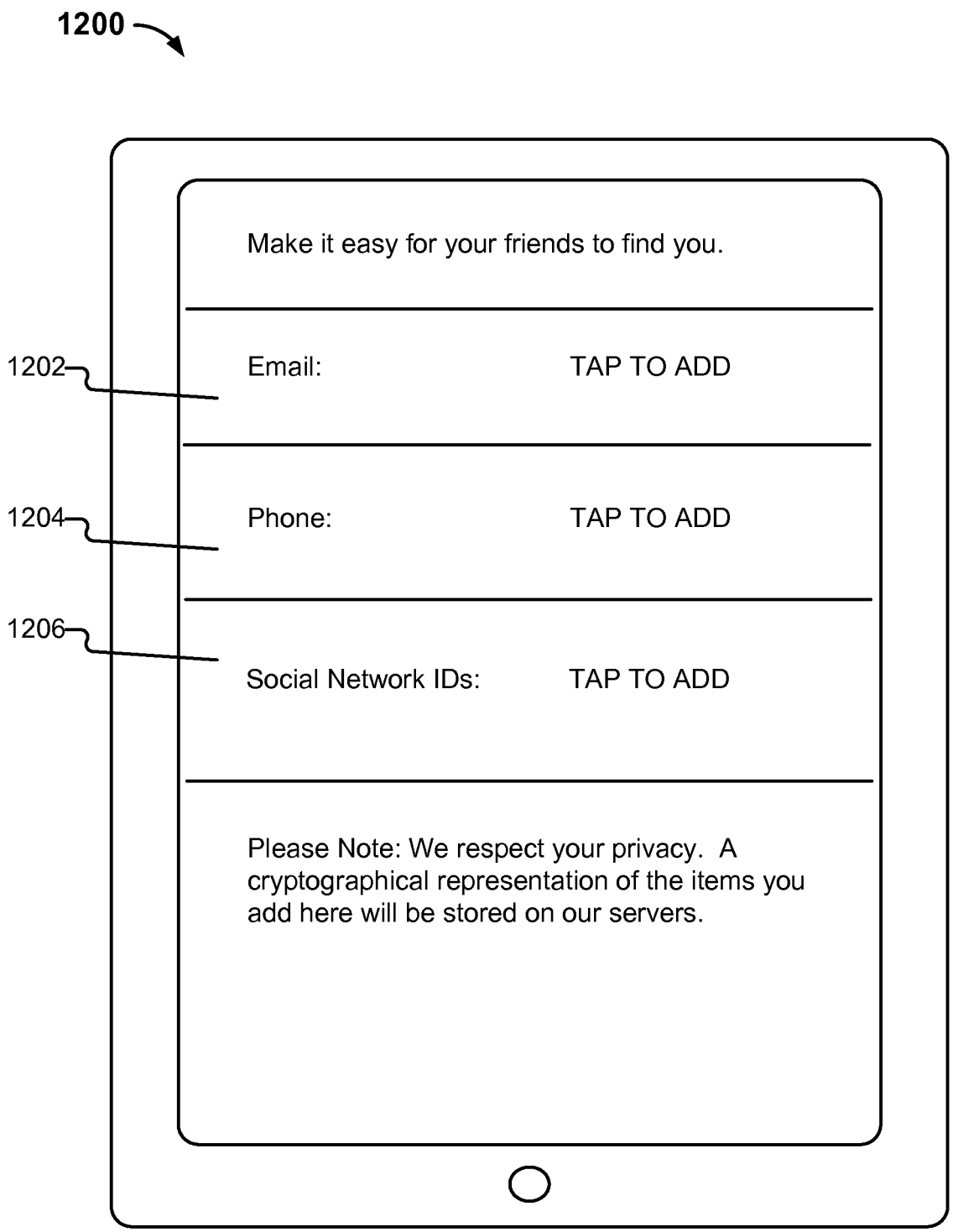
FIG. 12 illustrates an example of an interface.

Process 1100 begins at 1102 when a set of one or more foreign identifiers is received. As one example, by interacting with regions 1202, 1204, and 1206, respectively, of interface 1200 (shown in FIG. 12), Bob can enter one or more respective email addresses, phone numbers, or social networking identifiers. Any such identifiers provided by Bob in interface 1200 are received at 1102.

At 1104, each foreign identifier (e.g., provided by Bob interacting with any/all of regions 1202, 1204, and 1206) is transformed. One example of a transformation is a one-way cryptographic hash. For example, any of: SHA128, SHA256, SHA384, SHA512, MD5, as well as any other appropriate cryptographic hash functions (including proprietary techniques) can be used to transform a given foreign identifier at 1104. Further, as explained above, multiple rounds of hashing can be performed (e.g., multiple rounds of SHA256), as can modified versions of cryptographic hash functions (e.g., incorporating multiple pieces of information/seeds generated from hardware information/etc). Another approach is to combine the user provided foreign identifier with other data to create a unique transformation of the foreign identifier (without, or in combination with using a cryptographic hash function). For example, values can be added, one or more intersections can be made (e.g., to find common elements), the values can be multiplied, and/or other approaches can be used to obtain a unique result.

At 1106, the set of transformed foreign identifiers (e.g., as generated at 1104) is transmitted to platform 102. As with other communications made between apps and platform 102, the information to be transmitted can be encrypted with a symmetric cryptographic technique (e.g., AES, IDEA, etc.) and further encapsulated with TLS/SSL in conjunction with transmission to platform 102. Platform 102 associates the received transformed values with the transmitting user's native identifier. Thus, for example, where Bob provides two email addresses, one phone number, and two social networking site identifiers, each of the transformed five foreign identifiers will be associated with a representation of Bob's account name on platform 102. As one example, in some embodiments, platform 102 maintains a foreign identifier table, which associates a set of one or more hashed foreign identifiers (e.g., hashes of the information provided by Bob in interface 1200) with a given hashed username (e.g., a hashed username 124 appearing in table, which includes an entry for a hashed value of "Bob").

In some embodiments, one or more optional checks is performed in conjunction with process 1100. For example, app 138 can be configured to verify that the data provided by Bob in interface 1200 in fact belongs to Bob. As one example, app 138 can transmit all or some of the entries made by Bob in interface 1200 to a third party verification service 140 that sends an SMS, email, or other appropriate type of message to the number or account specified by Bob in interface 1200. In this scenario, the third party verifier receives the cleartext identifier (e.g., phone number) and a one-time use token (e.g., generated by app 138 or platform 102, as applicable). When the third party verifier verifies the information (e.g., Bob responds to an SMS he receives from the third party verifier), the third party verifier notifies app 138 (or platform 102, as applicable) that an account associated with the one-time use token was verified. Social networking account ownership can be similarly verified (e.g., through third party verifiers and/or through verification services made available as APIs by the social networking sites). As another example, in conjunction with portion 1106 of process 1100, platform 102 can be configured to communicate with a third party verification service, or to provide verification services itself, as applicable. In various embodiments, Bob demonstrates ownership of the information that he provides in interface 1200 by clicking on a one-time use link, entering a one-time use code, or otherwise verifying the information belongs to him, without requiring the storing of the data he provides in interface 1200.

Figure 13:
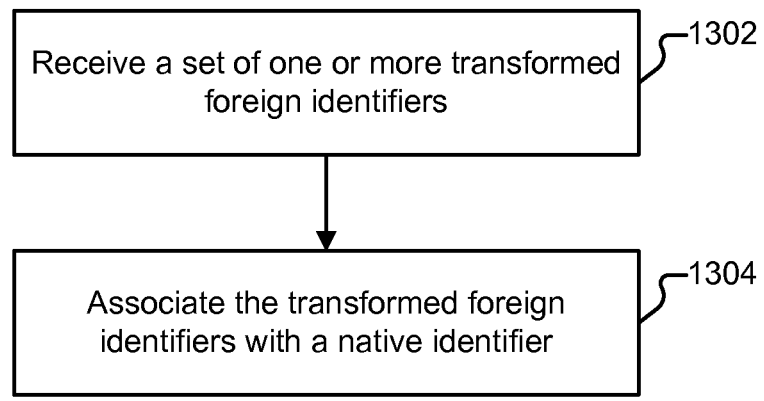
FIG. 13 illustrates an embodiment of a process for registering transformed foreign identifiers.

FIG. 13 illustrates an embodiment of a process 1300 for registering transformed foreign identifiers. In some embodiments, process 1300 is performed by a server providing secure directory services, such as platform 102. The process begins at 1302 when a set of one or more transformed foreign identifiers is received. As one example, such a set is received (by platform 102) when client device 114 executes portion 1106 of process 1100. At 1304, the received transformed foreign identifiers are associated with a native account. As explained above, database 120 can maintain a foreign identifier table, which associates a set of one or more hashed foreign identifiers (e.g., hashes of the information provided by Bob in interface 1200) with a given hashed username (e.g., a hashed username appearing in table 124, which includes an entry for a hashed value of "Bob").

Figure 14:
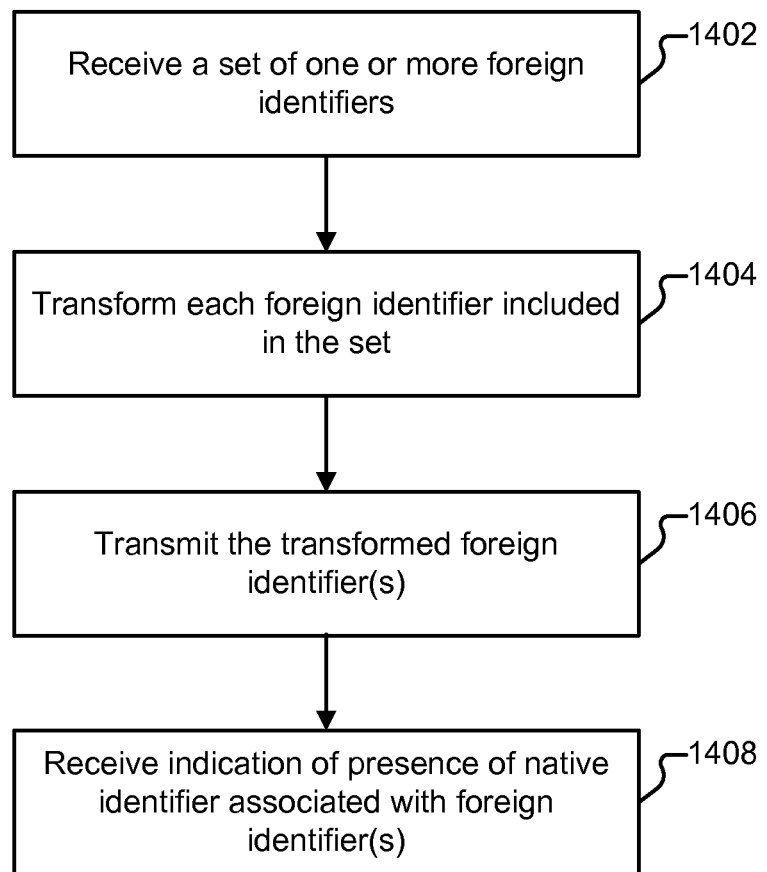
FIG. 14 illustrates an embodiment of a process for querying a secure directory service.

FIG. 14 illustrates an embodiment of a process 1400 for querying a secure directory service. In some embodiments, process 1400 is performed by a client device, such as client device 106. Process 1400 can be initiated in a variety of ways. As one example, process 1400 can be initiated in conjunction with a service registration. For example, process 1400 can be integrated into process 200 such that querying with the secure directory service occurs in conjunction with registering for an account on platform 102. In this scenario, a newly registered user (e.g., after portion 214 of process 200 has been performed) can be prompted to "Find Friends Already Using Platform 102," which will initiate a secure analysis of the user's addressbook, described in more detail below. Process 1400 can also be initiated on demand in a variety of contexts. A first example is where a user, such as Bob, selects a "Find Friends Already Using Platform 102" option from a menu offered by app 138. Here, Bob will be prompted for permission to upload transformations of entries in his phone's addressbook to platform 102 for matching. The addressbook check can be performed once (e.g., at enrollment, or when specifically initiated by Bob), and can also be performed periodically (e.g., once a day or once a week) to make sure that any new entries in Bob's addressbook are periodically checked for counterparts on platform 102. A second example is where a user, such as Bob, provides a foreign identifier directly into region 302 (i.e., he is attempting to send a message to a specific individual, for whom he knows a foreign identifier). In that scenario, the entered foreign identifier can be queried against platform 102 prior to, or in conjunction with, transmitting the message to platform 102 (similar to what occurs at 402 in process 400).

Returning to process 1400, the process begins at 1402 when a set of one or more foreign identifiers is received. As explained above, the foreign identifiers can be received at a variety of times, in a variety of contexts. As one example, when a user elects to search for all known friends/contacts, the set of one or more foreign identifiers can be received by app 138 receiving permission to access an addressbook on device 114, and in response accessing the addressbook. As another example, a set of one or more foreign identifiers can be received periodically (e.g., by app 138 performing a daily check for new friends/contacts against platform 102 using newly changed entries in the addressbook) at 1402. As yet another example, a single (or multiple) foreign identifier can be received at 1402 when a user enters a foreign identifier into region 302 of embodiments of interface 300. As yet another example, platform 102 (or other embodiments of platforms making available secure directory services) can make available a variety of APIs, web forms, or other interfaces (in addition to or instead of) apps such as app 116 and 138 that a user can use to query foreign identifiers. Any such interfaces would similarly receive a set of one or more foreign identifiers at 1402.

At 1404, each foreign identifier included in the set received at 1402 is transformed. In various embodiments, the transformation performed at 1404 is the same type of transformation performed at 1104. Thus, for example, if the transformation performed at 1104 uses SHA128 (for a given embodiment), the transformation performed at 1404 also uses SHA128 (for the same embodiment).

At 1406, the set of transformed foreign identifier(s) (e.g., as generated at 1404) is transmitted, e.g., to platform 102. As will be described in more detail below, platform 102 will perform a matching operation of the received transformed foreign identifiers (i.e., as received in response to portion 1406 of process 1400) against previously received transformed foreign identifiers (e.g., as stored in database 120).

Finally, at 1408, an indication is received of the presence of native identifier(s) associated with the set of foreign identifier(s) that were transmitted at 1406. As one example, where the set received at 1402 is obtained from an addressbook, a variety of indications can be presented to the owner of the addressbook at 1408, including a count of the number of matches found (e.g., "We found ten of your friends"), the specific entries matched (e.g., "We found Jane Smith, and Tom Jones, and . . . "), and taking the user to an addressbook view inside app 138—listing all matched entries in alphabetical order. In various embodiments, where the user has granted device addressbook access permission to app 138, app 138 (without transmitting data to platform 102) supplements the list of contacts maintained by app 138 with information from the device addressbook. For example, if the device addressbook and app 138 both have an entry for a particular phone number (e.g., 555-666-1212), the name corresponding to the entry for 555-666-1212 in the device addressbook can be imported into app 138 and used as a default friendly name in app 138. If the user revokes access to the device addressbook by app 138, the imported information can be automatically removed.

As yet another example, where the set received at 1402 is received in response to the user typing one or more entries into region 302, the indicator can be a checkmark (or other icon) placed on/near the entry in region 302, the changing of the entry from one color to another in region 302, or other graphical elements. Where no native identifier is found by platform 102 to be associated with the received foreign identifier(s), an appropriate indication can also be made. For example, messages such as "we could not find any of your friends" can be presented to the user. Where the unmatched foreign identifier is provided in region 302, a visual indication can similarly be provided, such as an "X" mark or a different color being used to indicate that no match was found for the foreign identifier entered into region 302. In some embodiments, where no match is found (e.g., in response to a foreign identifier entered into region 302), app 138 can provide the user with an "Invite this user" option, which can trigger an email, text message, or other appropriate message to be sent from platform 102 (or other appropriate message originator) to the foreign identifier, informing the recipient that the user of platform 102 would like to communicate with the recipient via platform 102. In various embodiments, the "Invite this User" message sent to the foreign identifier is facilitated by third party verification service 140.

Figure 15:
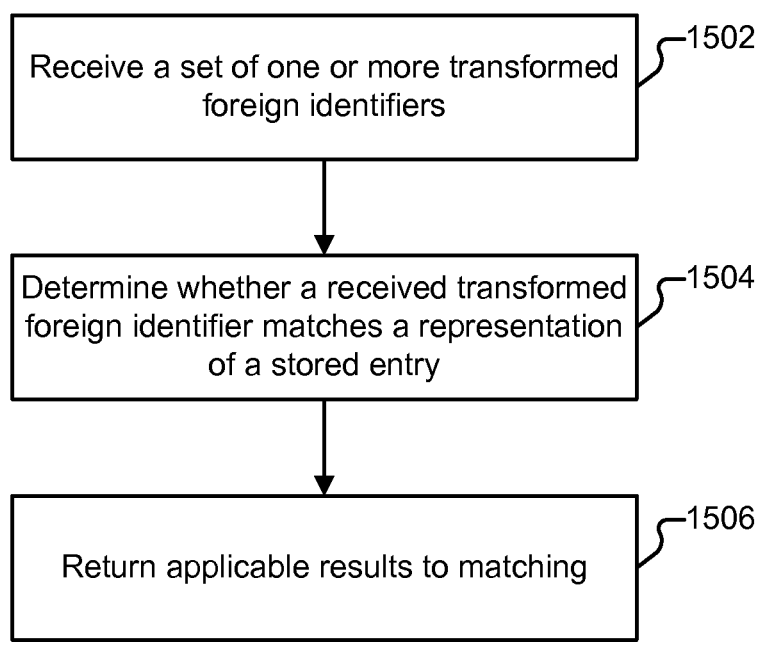
FIG. 15 illustrates an embodiment of a process for querying a secure directory service.

FIG. 15 illustrates an embodiment of a process 1500 for querying a secure directory service. In some embodiments, process 1500 is performed by a server providing secure directory services, such as platform 102. The process begins at 1502 when a set of one or more transformed foreign identifiers is received. As one example, such a set is received (by platform 102) when client device 114 executes portion 1406 of process 1400. Suppose, in the following example, that a user of platform 102, hereinafter named "David," has sent a set of one or more transformed identifiers to platform 102 (that is received by platform 102 at 1502). At 1504, a determination is made as to whether the received transformed foreign identifiers match a representation of a stored entry. A variety of matching techniques can be used at 1504. As one example, an exact match can be performed, e.g., with the SHA128 value of "555-123-4567" (received from David at 1502) being used as a query against the foreign identifier table, where SHA128 is also used as the transformation approach at 1104. As another example, a fuzzy match can be performed. For example, instead of storing an entire SHA128 hash in database 120, the stored hash could be truncated (or otherwise transformed in conjunction with storage). When an attempt is made to match the SHA128 value of "555-123-4567" with the contents of database 120, a fuzzy match can be used, as applicable.

At 1506, any results obtained as a result of the matching performed at 1504 are returned (e.g., to the entity from which the set was received at 1502—such as David). As one example, suppose, as a result of the matching performed at 1504, platform 102 determines that the SHA128 hashed value of the phone number, "555-123-4567" is present in the foreign identifier table. Platform 102 can determine from the information included in database 120 that the hashed value of "555-123-4567" is associated with a particular hashed native identifier (i.e., a hashed username of a user of platform 102). Suppose the native identifier is "JoeBob22" and the SHA128 hashed value of "JoeBob22" is associated with the SHA128 hashed value of "555-123-4567" in database 120. At 1506, the result returned to David is the SHA128 hashed value of "JoeBob22." David's app can now use the hashed username to compose a message to the platform 102 user, "JoeBob22." David will know that platform 102 found a match for (a transformation of) 555-123-4567, which belongs to his friend Joe Jackson, as he composes his message (e.g., because of visual indicators in the interface that a match was found for 555-123-4567, which David knows to be his friend Joe's phone number). However, in some embodiments, the message composition interface will not display to David that the phone number "555-123-4567" corresponds to userID "JoeBob22" unless/until the user (JoeBob22) responds to a message from David (protecting the privacy of the identifier "JoeBob22" unless/until the user responds to David). One reason for this is as follows: in various embodiments, a user's username on platform 102 is a message parameter—it is included in DSB messages sent by the user to other users. Unless/until Joe responds to a message from David, David will not receive a DSB from Joe (which would include the username "JoeBob22").

G. Additional Embodiments of Secure Directory Services

Secure Directory Services can be used in a variety of environments, and in conjunction with a variety of identifiers/transactions/etc. For example, SDSes can be used in the financial services industry with respect to credit card transactions and other financial transactions, login names and passwords and biometric credentials authentication. SDSes can be used to securely and anonymously store values/identities that can be queried returning alternative values/account names/social network IDs/etc.

A first person can use Secure Directory Services techniques described herein to securely and anonymously register identities from various services that can help other people searching for particular information about the first person if he/she knows any of the registered identities. For example, where SDSes are deployed by an online/app dating service, if Janet knows that Steve's Twitter account is @Steve123 or phone number is (555)226-7220 and she wants to find out what Steve's user name is on the dating service, she can search for "@Steve123" or for (555)226-7220. If Steve registered his Twitter account and/or phone number with the dating service, then the SDSes will return Steve's account name on that dating service. Suppose Steve's account name is "ILoveDating2013." In various embodiments, "ILoveDating2013" is the information that will be returned when Janet searches for Steve using his Twitter account or phone number.

SDSes can also be used for authentication purposes, for access controls, personalization of devices, and sharing of information in a secure and anonymous manner. They can also be used in data mining techniques and, in general, in any case when the knowledge of one piece of information can return another piece of information, if both of them are cryptographically connected by something or somebody.

In various embodiments, Secure Directory Services are deployed in conjunction with a physical authentication device that uses challenge knowledge to gain access to specific information. That provides a higher layer of protection and security on top of existing protocols/security. As one example, physical device binding can be used, in which hardware information is collected from a phone (for example Device ID, MAC address of the WiFi card, Bluetooth card id, etc). At least some of the collected information is combined, using a one-way function, into a unique string. That string is sent to the server and used by anybody that wants to send a message to that user. When the message arrives, before it is decrypted, the app computes the device hardware information and the result is compared to the one stored in the message. If there is a match then the message is decrypted, if not, the message is not decrypted and an error is shown. This way only the receiving phone can decrypt the message.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
    receiving, by a server from a first user device, a representation of a foreign identifier, wherein the representation is a hash value that corresponds to an entity;
    processing, by the server, a query against a database table of a plurality of entities, including comparing the representation of the foreign identifier to an entry of the database table;
    determining, based on the comparison, that the representation of the foreign identifier matches the entry of the database table; and
    causing, by the server sending to the first user device an indication that the first representation of the foreign identifier matches the entry, the first user device to:
        update an address book on the first user device with information from the database table that corresponds to the entry, which enables, based at least in part on a hashed representation of a native identifier, the first user device to address an encrypted communication to a second user device associated with the update to the address book, wherein the indication sent to the first user device that the first representation of the foreign identifier matches the entry, further comprises the hashed representation of a native identifier.

2. The method of claim 1, wherein the foreign identifier is associated with a contact in the address book of the first user device.

3. The method of claim 2, wherein the foreign identifier comprises at least one of:
    a phone number;
    an email address;
    a social network identifier; or
    a username.

4. The method of claim 1, wherein a message is composed by the first user device based on the hash value of the recipient user.

5. The method of claim 1, comprising:
    receiving, by the server from the first user device, one or more second representations corresponding to one or more additional foreign identifiers; and
    storing the one or more second representations corresponding to the one or more additional foreign identifiers in the database to allow the one or more second user devices to discover an account associated with the first user device.

6. The method of claim 5, wherein the one or more additional foreign identifiers comprise at least one of:
    a phone number associated with the first user device;
    an email address associated with a user of the first user device;
    a social network identifier associated with the user of the first user device; or a username associated with the user of the first user device.

7. The method of claim 1, wherein the indication further comprises a hashed representation of a native identifier that allows the first user device to address an encrypted communication to a second user device.

8. The method of claim 1, further comprising:
receiving, by the server from the first user device, a second plurality of representations of a second plurality of foreign identifiers;
comparing the second plurality of representations of the second plurality of foreign identifiers to one or more entries of the database to determine whether the one or more of the second plurality of representations of the second plurality of foreign identifiers matches any of the one or more entries; and
sending, by the server to the first user device and based on a determination that none of the second plurality of representations of the second plurality of foreign identifiers match any of the one or more entries, a second indication that no contacts are associated with the second plurality of foreign identifiers.

9. A server comprising:
one or more processors; and
memory storing instructions that, when executed by the one or more processors, cause the server to:
receive, from a first user device, representation of a foreign identifier wherein the representation is a hash value that corresponds to an entity;
process a query against a database table of a plurality of entities to compare the representation of the foreign identifier to an entry of the database table;
determine, based on the query and the comparison, that the representation of the foreign identifier matches the entry of the database table; and
cause, by sending to the first user device an indication that the representation of the foreign identifier matches the entry, the first user device to:
update an address book on the first user device with information from the database table that corresponds to the entry, which enables, based at least in part on a representation of a native identifier, the first user device to address a communication to a second user device associated with the entry, wherein the indication sent to the first user device that the representation of the foreign identifier matches the entry, further comprises a hashed representation of a native identifier.

10. The server of claim 9, wherein the foreign identifier is associated with a contact in the address book of the first user device.

11. The server of claim 10, wherein the foreign identifier comprises at least one of:
a phone number;
an email address;
a social network identifier; or
a username.

12. The server of claim 9, wherein the instructions, when executed by the one or more processors, cause the server to:
receive, from the first user device, one or more additional representations corresponding to one or more additional foreign identifiers; and
store the one or more additional representations corresponding to one or more additional foreign identifiers in the database to allow one or more second user devices to discover an account associated with the first user device.

13. The server of claim 9, wherein the indication further comprises a hashed representation of a native identifier that allows the first user device to address an encrypted communication to a second user device.

14. The server of claim 9, wherein the instructions, when executed by the one or more processors, cause the server to:
receive, from the first user device, a second plurality of representations of a second plurality of foreign identifiers;
compare the second plurality of representations of the second plurality of foreign identifiers to one or more entries of the database to determine whether one or more of the second plurality of representations of the second plurality of foreign identifiers matches any of the one or more entries; and
send, to the first user device and based on a determination that none of the second plurality of representations of the second plurality of foreign identifiers match any of the one or more entries, a second indication that no contacts are associated with the second plurality of foreign identifiers.

15. A non-transitory computer-readable medium comprising instructions that, when executed, configure a server to:
receive, from a first user device, a representation of a foreign identifier wherein the representation is a hash value that corresponds to an entity;
process a query against a database table of a plurality of entities including a comparison of the first representation of the foreign identifier to an entry of the database table;
determine, based on the query, that the first representation of the first foreign identifier matches the entry of the database table; and
cause, by sending to the first user device an indication that the first representation of the foreign identifier matches the entry, the first user device to:
update an address book on the first user device with information from the database table that corresponds to the entry, which enables, based at least in part on a native identifier, the first user device to address a communication to a second user device associated with the entry, wherein the indication sent to the first user device that the first representation of the foreign identifier matches the entry, further comprises a hashed representation of a native identifier.

16. The non-transitory computer-readable medium of claim 15, wherein the foreign identifier is associated with a contact in the address book of the first user device.

17. The non-transitory computer-readable medium of claim 16, wherein the foreign identifier comprises at least one of:
a phone number;
an email address;
a social network identifier; or
a username.

18. The non-transitory computer-readable medium of claim 15, wherein the instructions, when executed, configure the server to:
receive, from the first user device, one or more additional representations corresponding to one or more additional foreign identifiers; and
store the one or more additional representations corresponding to one or more additional foreign identifiers in the database to allow one or more second user devices to discover an account associated with the first user device.

19. The non-transitory computer-readable medium of claim 15, wherein the indication further comprises a hashed representation of a native identifier that allows the first user device to address an encrypted communication to a second user device.

20. The non-transitory computer-readable medium of claim 15, wherein the instructions, when executed, configure the server to:
- receive, from the first user device, a second plurality of representations of a second plurality of foreign identifiers;
- compare the second plurality of representations of the second plurality of foreign identifiers to one or more entries of the database to determine whether one or more of the second plurality of representations of the second plurality of foreign identifiers matches any of the one or more entries; and
- send, to the first user device and based on a determination that none of the second plurality of representations of the second plurality of foreign identifiers match any of the one or more entries, a second indication that no contacts are associated with the second plurality of foreign identifiers.

* * * * *